US008814202B2

(12) United States Patent
Matsushita et al.

(10) Patent No.: US 8,814,202 B2
(45) Date of Patent: Aug. 26, 2014

(54) CURTAIN AIRBAG

(75) Inventors: Tetsuya Matsushita, Yokohama (JP);
Atsushi Nakashima, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/814,385

(22) PCT Filed: Aug. 1, 2011

(86) PCT No.: PCT/JP2011/067608
§ 371 (c)(1),
(2), (4) Date: Feb. 5, 2013

(87) PCT Pub. No.: WO2012/017987
PCT Pub. Date: Feb. 9, 2012

(65) Prior Publication Data
US 2013/0134694 A1    May 30, 2013

(30) Foreign Application Priority Data
Aug. 6, 2010    (JP) .................................. 2010-178158

(51) Int. Cl.
*B60R 21/213* (2011.01)
*B60R 21/231* (2011.01)

(52) U.S. Cl.
USPC ...................................................... 280/730.2

(58) Field of Classification Search
USPC ...................................................... 280/730.2
See application file for complete search history.

(56) References Cited

U.S. PATENT DOCUMENTS

| 6,095,551 | A  | * | 8/2000  | O'Docherty .............. 280/730.2 |
| 6,394,487 | B1 | * | 5/2002  | Heudorfer et al. ............ 280/729 |
| 6,428,037 | B1 | * | 8/2002  | Bakhsh et al. ................ 280/729 |
| 6,527,296 | B2 | * | 3/2003  | Bakhsh et al. ............. 280/730.2 |
| 6,616,178 | B1 | * | 9/2003  | Nanbu ........................ 280/730.2 |
| 6,644,687 | B2 | * | 11/2003 | Saito et al. ................. 280/730.2 |
| 6,705,639 | B2 | * | 3/2004  | Masuda ..................... 280/730.2 |
| 6,736,422 | B2 | * | 5/2004  | Nakanishi .................. 280/730.2 |
| 6,843,502 | B2 | * | 1/2005  | Aoki et al. ................. 280/730.2 |
| 6,932,386 | B2 | * | 8/2005  | Ikeda et al. .................... 280/739 |
| 6,971,665 | B2 | * | 12/2005 | Tanaka .......................... 280/729 |

(Continued)

FOREIGN PATENT DOCUMENTS

| JP | 2002-302005 | 10/2002 |
| JP | 2006-008039 | 1/2006 |
| JP | 2007-022279 | 2/2007 |
| JP | 2009-286300 | 12/2009 |

OTHER PUBLICATIONS

International Search Report of PCT/JP2011/067608 Mailed on Nov. 1, 2011 (2 pages).

*Primary Examiner* — Nicole Verley
(74) *Attorney, Agent, or Firm* — Brinks Gilson & Lione

(57) ABSTRACT

A curtain airbag mitigating possible occupant ejection from a vehicle. The curtain airbag includes a serial main chamber that is capable of being inflated and deployed along a vehicle cabin side face; a delay chamber that is positioned at a front end section of the serial main chamber and that is inflated and deployed so as to overlap an A1 impact point below an A-pillar of the vehicle; and an ace tab that fixes the upper edge of the delay chamber to the A-pillar. The ace tab is provided at a position overlapping a straight line LS that is provided on the shortest way from the A1 impact point to the A-pillar, as viewed from inside the vehicle cabin.

6 Claims, 5 Drawing Sheets

(56) References Cited

U.S. PATENT DOCUMENTS

| | | | |
|---|---|---|---|
| 6,991,255 B2 * | 1/2006 | Henderson et al. | 280/730.2 |
| 7,159,895 B2 * | 1/2007 | Aoki et al. | 280/730.2 |
| 7,172,212 B2 * | 2/2007 | Aoki et al. | 280/730.2 |
| 7,213,835 B2 * | 5/2007 | Totsuka et al. | 280/730.2 |
| 7,219,921 B2 * | 5/2007 | Noguchi | 280/730.2 |
| 7,264,269 B2 * | 9/2007 | Gu et al. | 280/730.2 |
| 7,267,364 B2 * | 9/2007 | Noguchi et al. | 280/730.2 |
| 7,325,826 B2 * | 2/2008 | Noguchi et al. | 280/730.2 |
| 7,357,413 B2 * | 4/2008 | Noguchi et al. | 280/730.2 |
| 7,441,796 B2 * | 10/2008 | Noguchi et al. | 280/730.2 |
| 7,699,342 B2 * | 4/2010 | Goto | 280/730.2 |
| 7,740,270 B2 * | 6/2010 | Imamura | 280/730.2 |
| 7,744,121 B2 * | 6/2010 | Ishikawa et al. | 280/730.2 |
| 7,758,068 B2 * | 7/2010 | Noguchi et al. | 280/730.2 |
| 7,775,553 B2 * | 8/2010 | Takemura et al. | 280/730.2 |
| 7,789,418 B2 * | 9/2010 | Wipasuramonton et al. | 280/730.2 |
| 7,810,838 B2 * | 10/2010 | Iwayama et al. | 280/730.2 |
| 7,896,387 B2 * | 3/2011 | Ideue | 280/730.2 |
| 7,922,192 B2 * | 4/2011 | Fukuda et al. | 280/730.2 |
| 8,408,591 B2 * | 4/2013 | Walston | 280/730.2 |
| 8,414,020 B2 * | 4/2013 | Beppu et al. | 280/730.2 |
| 2005/0167957 A1 * | 8/2005 | Kumagai et al. | 280/730.2 |
| 2005/0206140 A1 * | 9/2005 | Bakhsh et al. | 280/730.2 |
| 2006/0043706 A1 * | 3/2006 | Kosugi et al. | 280/730.2 |
| 2006/0186652 A1 | 8/2006 | Sunabashiri | |
| 2006/0202456 A1 * | 9/2006 | Bernat | 280/739 |
| 2006/0208466 A1 * | 9/2006 | Kirby | 280/730.2 |
| 2007/0001433 A1 * | 1/2007 | Gu et al. | 280/729 |
| 2007/0102907 A1 * | 5/2007 | Bowers | 280/730.2 |
| 2007/0164543 A1 * | 7/2007 | Fukuda et al. | 280/729 |
| 2008/0290634 A1 * | 11/2008 | Sugimori et al. | 280/728.2 |
| 2009/0127836 A1 * | 5/2009 | Umeda et al. | 280/730.2 |
| 2009/0283992 A1 * | 11/2009 | Sugimori et al. | 280/730.2 |
| 2011/0291393 A1 * | 12/2011 | Nakamura et al. | 280/730.2 |
| 2012/0025502 A1 * | 2/2012 | Matsushita et al. | 280/730.2 |
| 2012/0119476 A1 * | 5/2012 | Saiki et al. | 280/730.2 |
| 2012/0139215 A1 * | 6/2012 | Heuschmid et al. | 280/730.2 |
| 2012/0256402 A1 * | 10/2012 | Kato et al. | 280/730.2 |
| 2012/0299275 A1 * | 11/2012 | Saimura et al. | 280/729 |
| 2012/0313356 A1 * | 12/2012 | Saimura et al. | 280/730.2 |

\* cited by examiner (a)

(b)

(a)

(b)

CURTAIN AIRBAG

BACKGROUND

1. Field of the Invention

The present invention relates to a curtain airbag that reduces the probability of ejection of a vehicle occupant during rollover (overturning) of a vehicle.

2. Related Technology

In recent years, high levels of safety performance have been required of vehicles. This trend is shared across countries around the world, where most vehicles are currently standard-equipped with airbags as vehicle safety devices. Firms involved in vehicle development have adopted ongoing safety improvements as a major development guideline. In keeping with this, new airbags are continually being developed.

Standards for evaluating vehicle safety differ from country to country, and firms approach product development such that products can meet evaluation standards in multiple countries. In the United States, for instance, which has the largest automobile fleet in the world, Federal Motor Vehicle Safety Standards (FMVSS) are issued by the National Highway Traffic Safety Administration (NHTSA). In a Notice of Proposed Rulemaking (NPRM, Docket Number: NHTSA-2009-0183) for FMVSS, scheduled to be issued by the NHTSA, a requirement is proposed that aims at "reducing the probability of occupant ejection from a vehicle through a side window using an ejection mitigation system in the event of a side impact crash or rollover (overturning)". The requirement can be met by providing a curtain airbag as a device intended to reduce ejection from a vehicle, such that the curtain airbag constitutes herein the ejection mitigation system.

A curtain airbag is an airbag disposed above a door and that inflates and deploys along vehicle side windows, upon occurrence of an impact, to protect an occupant thereby. An ordinary curtain airbag is designed to have a pressure duration, when inflated and deployed, longer than that of a front airbag or the like. That is because the time during which an impact unfolds is lengthened if, for instance, rollover follows the lateral collision. Thus, the curtain airbag is intended to maintain the inflated state until and during rollover, to restrain thereby the occupant, and prevent the occupant from being ejected from the vehicle.

For instance, a curtain airbag that deploys along a vehicle side face comprises a series of chambers, as disclosed in Japanese Patent Application Publication No. 2002-302005. These chambers mitigate the impact that an occupant receives upon lateral collision of the vehicle, and prevents the occupant from being ejected out of the vehicle during vehicle rollover.

Upon collision of an impactor against an impact point prescribed in FMVSS 226, tension lines form radially from that impact point up to a respective tab that fixes the curtain airbag to the vehicle body. Herein, a tension line denotes a taut line that joins the center of impact, occurring upon impact against a given impact point, with a respective fixed point. Tension lines that are subject to the highest possible tension are formed in order to enhance the ejection mitigation function of the curtain airbag. That is because the higher the tension that is applied to the curtain airbag upon collision, the greater are the forces that oppose ejection of the occupant.

SUMMARY

In the light of the above issues, the present invention to provide a curtain airbag having an enhanced ejection mitigation function with regards to a vehicle occupant.

In order to solve the above problems, a curtain airbag embodying the principles of the present invention includes, in a typical configuration: a serial main chamber that is capable of being inflated and deployed along a vehicle cabin side face; a delay chamber that is positioned at a front end section of the serial main chamber and that is inflated and deployed so as to overlap an A1 impact point below an A-pillar of the vehicle; and a first tab that fixes an upper edge of the delay chamber to the A-pillar, wherein the first tab is provided at a position overlapping a straight line that is provided on the shortest way from the A1 impact point to the A-pillar, as viewed from inside the vehicle cabin.

The impact point referred to as the A1 impact point in the present application is defined in NPRM (Docket Number: NHTSA-2009-0183; published Dec. 2, 2009). The determination method of the A1 impact point is prescribed in V. "Proposed Ejection Mitigation Requirements and Test Procedures", d. "Locations Where the Device Would Impact the Ejection Mitigation Countermeasure To Assess Efficacy", and "4. Method for Determining Impactor Target Locations" of NPRM. The specific impact points are defined as impact points positioned on the vehicle front side of a primary target position (primary target) in a front window. The Notice of Proposed Rulemaking (NPRM: Docket Number: NHTSA-2009-0183) in the description of the present application is based on FMVSS 226 as officially enacted.

In the above configuration, the first tab is a tab that comes maximally close to the A1 impact point. Upon collision of an impactor against the various impact points, tension lines form radially from that impact point up to a respective tab that fixes the curtain airbag to the vehicle body. The tab that contributes the most against collision, from among the tabs at the tip of the tension lines, i.e. the tab that receives the greatest load in preventing ejection of the occupant that is simulated by the impactor, is herein the tab that is immediate to the impact point. Therefore, the curtain airbag according to the present invention has a tab with maximally enhanced degree of contribution against ejection, namely has the first tab.

The curtain airbag may further comprise a second tab that fixes the upper edge of the delay chamber to the A-pillar at an area between the first tab and a boundary between the delay chamber and the serial main chamber.

The second tab elicits the effect of preventing the airbag from shifting upward during inflation and deployment, and affording inflation and deployment at a proper position. The second tab is conferred with a clearly different function from that of the first tab, i.e. imparting tension to the airbag. Therefore, the respective function of each of the two tabs can thus be distinctively brought out.

A lower end of the delay chamber when inflated and deployed may be positioned below a door beltline of the vehicle. The position of the curtain airbag is adjusted so as not to rise in a case where the second tab is present. However, if the delay chamber is long enough, the lower end of the inflated and deployed delay chamber becomes positioned below a door beltline of the vehicle, regardless of the presence or absence of the second tab. Such a delay chamber elicits the effect of reducing the extent of ejection, by virtue of a reaction force off a door trim by interfering with the latter, also when the delay chamber is pushed out of the vehicle when struck by the head of an occupant. Accordingly, the occupant can be prevented, yet more reliably, from being ejected through a window.

The present invention succeeds in providing a curtain airbag having an enhanced ejection mitigation function of a vehicle occupant.

DETAILED DESCRIPTION

Figure 1:
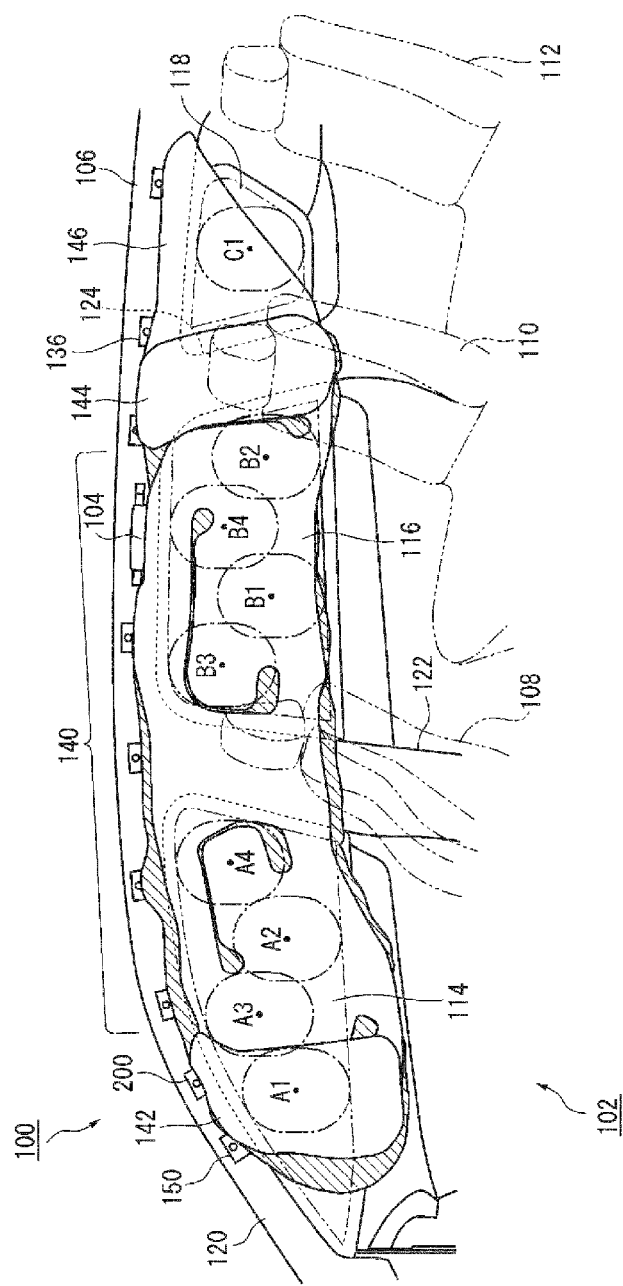
FIG. 1 is a diagram illustrating a curtain airbag according to an embodiment of the present invention.

Preferred embodiments of the present invention will be explained next in detail with reference to accompanying drawings. Dimensions, materials, other specific numerical values and the like given in the embodiments are only illustrative in character, for the sake of easier understanding of the invention, and, unless particularly stated otherwise, are not meant to limit the present invention in any way. In the description and the drawings, elements having substantially the same function and configuration are denoted by identical reference numerals, and a recurrent explanation thereof will be omitted. Elements that are not directly related to the present invention are omitted in the drawings.

FIG. 1 is a diagram illustrating a curtain airbag according to an embodiment of the present invention. FIG. 1 illustrates an example of a curtain airbag 100 in an inflated and deployed state. The drawings in the present application, including FIG. 1, illustrate the interior of the curtain airbag 100 in a perspective view. The explanation below refers to a curtain airbag 100 for a right side face of the vehicle, as illustrated in FIG. 1, but a curtain airbag for the left side face has a similar structure that is symmetrical with that of the right side.

As illustrated in FIG. 1, the curtain airbag 100 is provided with an inflator 104 that is a gas generating device. The airbag 100 receives a gas for inflation and deployment (hereinafter simply referred to as "gas"), supplied from the inflator 104, and, thereupon, inflates and deploys to protect an occupant thereby.

Although not shown, the curtain airbag 100 is housed by being attached, in a rolled-up state or in a folded state, to a roof side rail 106 at an upper portion of a side face section in a vehicle cabin. Ordinarily, the roof side rail 106 is covered with a roof trim, and is invisible from inside the vehicle cabin.

The curtain airbag 100 is formed into a bag-like shape through sewing of the front and back sides of a base fabric, which constitutes the surface of the curtain airbag 100, or by weaving using One-Piece Woven (OPW).

In the present embodiment, a vehicle 102 having three seats in a row (front seat 108, rear seat 110, and rearmost seat 112, in order from the vehicle front side) is exemplified as a vehicle in which the curtain airbag 100 is provided. Side windows 114, 116 and 118, in order from the front of the vehicle, are disposed on the side face section of the vehicle 102. In the vehicle cabin, the side window 118 is positioned to the side of the rearmost seat 112.

In the front-rear direction of each side window there is connected a plurality of pillars (posts) that support a roof (top). These pillars are referred to as an A-pillar 120, a B-pillar 122, a C-pillar 124 and a D-pillar (not shown), in order from the front of the vehicle 102.

The upper edge of the airbag 100 is provided with a plurality of tabs (tab 136 and so forth) as attachment members. The tab 136 is a belt-like member used to attach the airbag 100 to the vehicle 102.

Upon occurrence of a lateral collision or rollover (overturning) in the vehicle 102, firstly a sensor (not shown) that is provided in the vehicle 102 senses the impact, and an ignition signal is accordingly transmitted to the inflator 104. The gas generator in the inflator 104 burns thereupon, and the generated gas is supplied to the curtain airbag 100. Upon receiving the gas from the inflator 104, the curtain airbag 100 inflates and deploys downward along the side face section of the vehicle cabin (side window 114 and so forth), as illustrated in FIG. 1, to protect an occupant thereby.

The curtain airbag 100 comprises a serial main chamber 140 capable of inflation and deployment along the vehicle cabin side face, and delay chambers 142, 144 that are positioned at the front and rear end sections of the serial main chamber 140. In the drawings of the present application, non-inflation regions into which no gas flows are denoted as hatched portions. The delay chambers 142, 144 are cambers that start inflating with some delay with respect to the main chamber 140. The main chamber 140 deploys several tens of milliseconds after a collision, whereas the delay chambers 142, 144 deploy several hundreds of milliseconds after the collision. Therefore, the emphasis in the delay chambers 142, 144 is laid on ejection mitigation of a vehicle occupant during rollover rather than on fast impact protection during lateral collision of the vehicle 102.

A substantially triangular wide portion 146 is further provided on the rear edge section of the delay chamber 144 at the rear end section. The wide portion 146 prevents the occupant of the rearmost seat 112 from being ejected through the rearmost window 118. The wide portion 146, which is shaped in the form of a wide cloth, does not inflate, but becomes tensioned into a substantially planar shape, to restrain thereby the occupant.

FIG. 1 illustrates nine impact points, represented by reference numerals A1 to A4, B1 to B4 and C1. These impact points denote the presumed positions struck by the head of an occupant during a lateral collision, as established according to Federal Motor Vehicle Safety Standards (FMVSS). Ordinarily, the safety of a safety device such as a curtain airbag is evaluated (ejection mitigation performance evaluation test) by causing an impactor 170, which is the test device, to strike the impact points during a lateral collision test according to FMVSS. In particular, the frontmost impact point of the frontmost window 114 is referred to as the A1 impact point.

As illustrated in FIG. 1, the delay chamber 142 at the front end section inflates and deploys in such a manner so as to overlap, at least partly, the A1 impact point below the A-pillar 120 of the vehicle 102, as well as the projected shape, on the curtain airbag 100, of the impactor 170 that is pushed into the A1 impact point.

FIG. 2(a) and FIG. 2(b) are a set of enlarged diagrams of the delay chamber 142 of FIG. 1. FIG. 2(a) is a diagram of the delay chamber 142 viewed from inside the vehicle cabin, and FIG. 2(b) is a diagram of FIG. 2(a) viewed from above. In FIG. 2(a) and FIG. 2(b), the roof and so forth of the vehicle have been omitted. The curtain airbag 100 is provided with an ace tab 150 as a first tab that fixes the upper edge of the delay chamber 142 to the A-pillar 120.

As illustrated in FIGS. 2(a) and 2(b), a straight line that passes through the A1 impact point and point P1 results from drawing a straight line L1 that is provided on the shortest way derived from the A1 impact point to the A-pillar 120. As illustrated in FIG. 2(b), the A-pillar 120 bends outward as it descends towards the door beltline 160 from the roof (not shown), as viewed from above the vehicle 102. Therefore, the straight line L1 that joins the A1 impact point to the (fixing point T1 of the A-pillar 120) of the ace tab 150, and a straight line LS that is provided on the shortest way from the A1 impact point to the A-pillar 120, do not coincide in the three-dimensional space, but are slightly offset from each other in the vehicle width direction, as illustrated in FIG. 2(b). However, when the straight lines LS and L1 are projected onto the vehicle side face, the trajectories thereof coincide as straight lines that form an angle of about 90° with respect to the A-pillar 120 as illustrated in FIG. 2(a). In other words, as illustrated in FIG. 2(a), the ace tab 150 is provided at a position so as to overlap the straight line LS that is provided on the shortest way from the A1 impact point to the A-pillar, as viewed from inside the vehicle cabin.

Figure 2:
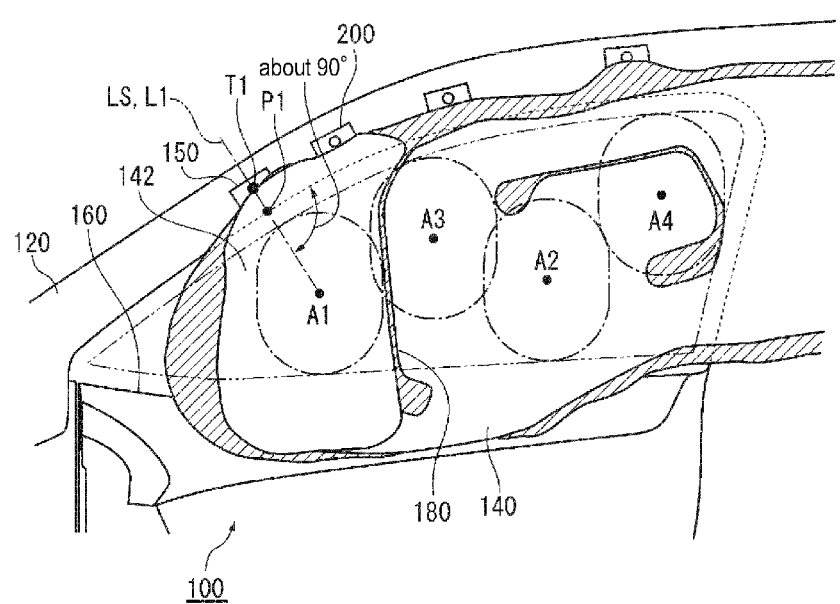
FIG. 2(a) and FIG. 2(b) are a set of enlarged diagrams of the delay chamber of FIG. 1.
Figure 2:
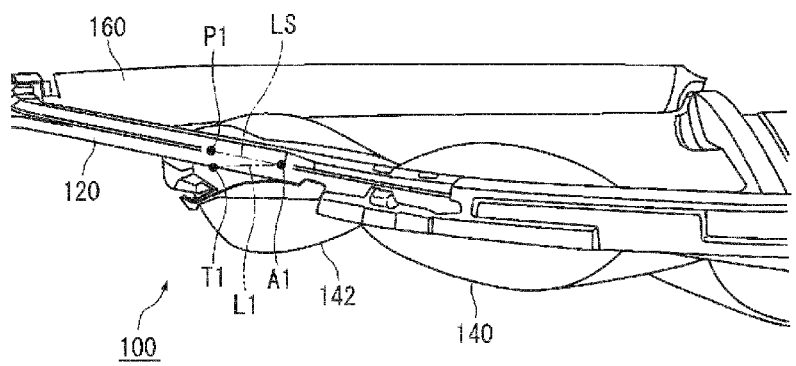
Figure 3:
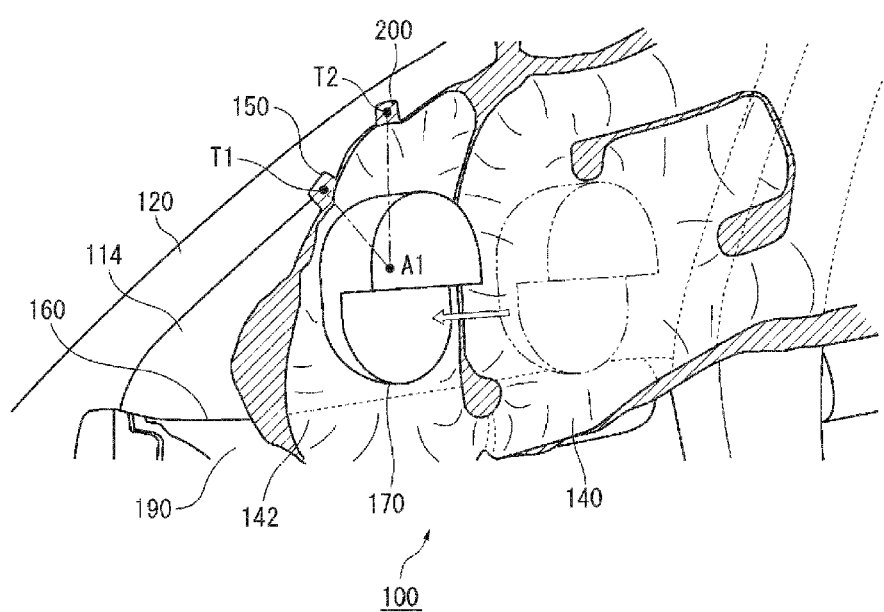
FIG. 3 is a perspective-view diagram illustrating the state resulting from an impactor strike against the an A1 impact point by way of the delay chamber of FIG. 2.

FIG. 3 is a perspective-view diagram illustrating the state resulting from an impact of the impactor 170 against the A1 impact point by way of the delay chamber 142 of FIG. 2. FIG. 3 illustrates only the head portion (impactor head) of the impactor 170.

In the configuration of the curtain airbag 100 of the present embodiment, the ace tab 150 is a tab that comes maximally close to the A1 impact point, and hence no tab can be provided at a position closer to the A1 impact point than the ace tab 150. For instance, segment A1T2, which is the distance between a support tab 200 other than the ace tab 150 and the A1 impact point, is longer than segment A1T1, which is the distance between the ace tab 150 and the A1 impact point. When the impactor 170 strikes against the various impact points, such as the A1 impact point, tension lines form radially from each impact point up to a respective tab that fixes the curtain airbag 100 to the vehicle body. Segment A1T1 and segment A1T2 are tension lines in FIG. 3. The tab that contributes the most against collision, from among the tabs at the tip of the tension lines, i.e. the tab that receives the greatest load in preventing ejection of the occupant that is simulated by the impactor 170, is herein the ace tab 150, which is the tab immediate to the impact point. Therefore, the ace tab 150 is the tab that can impart the greatest tension in the vicinity of the A1 impact point, in the curtain airbag 100. The ejection mitigation function of the curtain airbag 100 that has such an ace tab 150 is evidently higher than that of a curtain airbag that lacks the ace tab 150.

In the present embodiment, the ace tab 150 is provided at an optimal position with respect to the A1 impact point, but tabs that are positioned at a shortest distance from a respective impact point may be provided, in the same way as the ace tab 150, at other impact points. The ejection mitigation effect may thus be enhanced.

Figure 4:
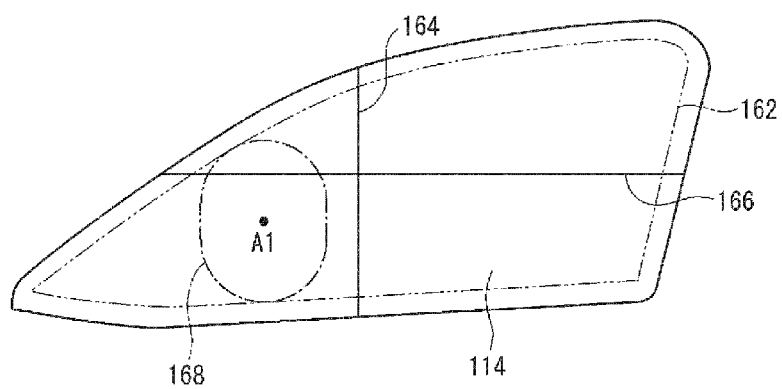
FIG. 4 is a diagram illustrating a window in FIG. 2(a)

FIG. 4 is a diagram illustrating the window 114 of FIG. 2(a). The setting method of the A1 impact point will be explained hereafter with reference to FIG. 4. According to FMVSS 226, firstly there is drawn a line 162 offset by 25 mm from the window frame of the window 114 to the front of the B-pillar 122 (not shown in FIG. 4). The distance of 25 mm is a distance in the perpendicular direction from the window frame, not an oblique distance along the window 114.

Next, the vertical line 164 and a horizontal line 166 that run through the geometrical center (barycenter) of the window 114 are drawn, to divide the window 114 in four quadrants. A visible outline 168 of the impactor head of the impactor 170, as prescribed in FMVSS 226, is disposed so as to come into contact, at two sites, with the offset line 162 at the upper and lower front quadrants. This position, referred to as the A1 impact point, is the frontmost impact point in the ejection mitigation performance evaluation test conditions as prescribed in FMVSS 226.

Figure 5:
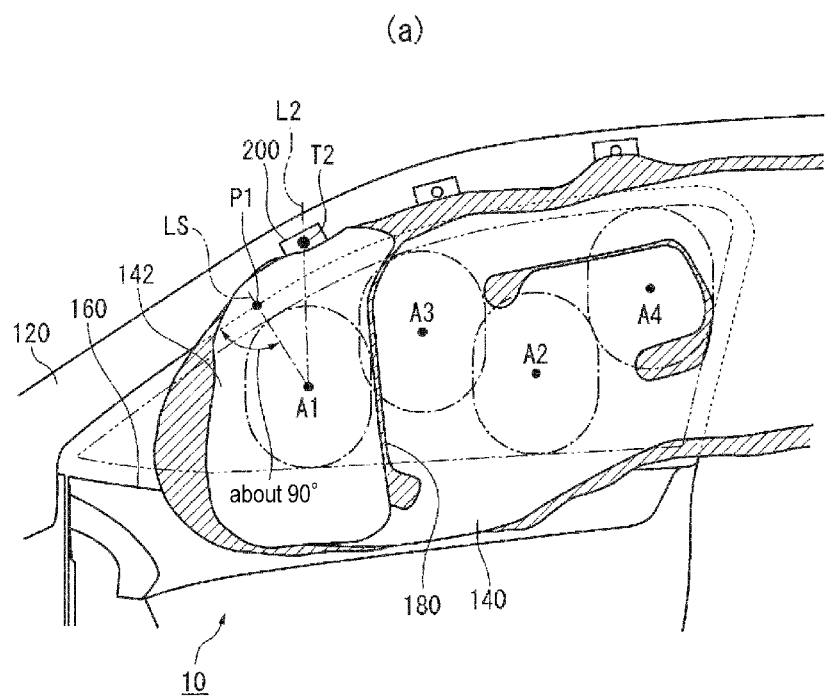
FIG. 5(a) and FIG. 5(b) are a set of diagrams illustrating a comparative example of the embodiment of the present invention as illustrated in FIG. 2.
Figure 5:
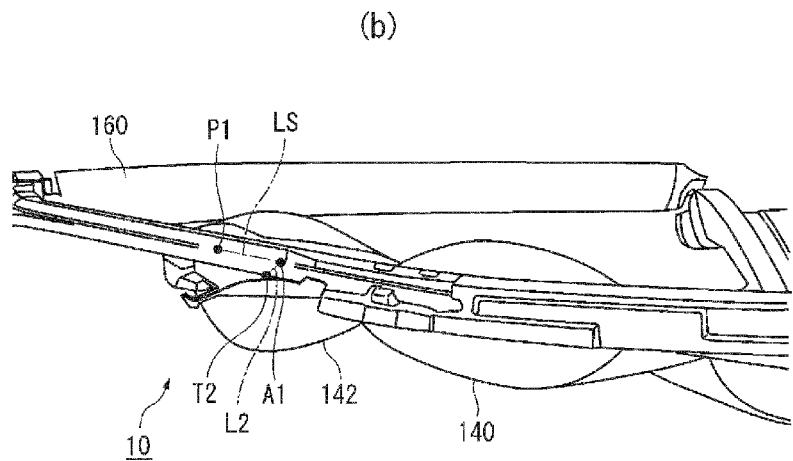

FIG. 5(a) and FIG. 5(b) are a set of diagrams illustrating a comparative example of the embodiment of the present invention as illustrated in FIG. 2(a) and FIG. 2(b). In the curtain airbag 10 illustrated in FIG. 5(a), elements identical to those of FIG. 2(a) are denoted by the same reference numerals. In the curtain airbag 10 of FIG. 5(a) only one tab (support tab 200 in the present embodiment in FIG. 2(a)) fixes the delay chamber 142 to the A-pillar 120.

In the comparative example of FIG. 5(a), the tab that contributes the most against collision at the A1 impact point is the support tab 200. For instance, as explained regarding FIG. 3, segment A1T2, which is the distance between the support tab 200 and the A1 impact point, is longer than segment A1T1, which is the distance between the ace tab 150 and the A1 impact point. Therefore, the tension that can be applied to the curtain airbag 10 by the support tab 200 in the comparative example of FIG. 5(a), in which the support tab 200 alone is provided, in the case of a strike at the A1 impact point, is less than the tension that the ace tab 150 of the present embodiment of FIG. 2(a) can apply to the curtain airbag 100. Thus, the degree of contribution of the support tab 200 against a strike is less than that of the ace tab 150.

Returning to FIG. 2(a), an explanation follows next on the support tab 200 of the curtain airbag 100 of the present embodiment. The curtain airbag 100 of the present embodiment is provided with the support tab 200 that constitutes a second tab in addition to the ace tab 150 that constitutes a first tab. The support tab 200 fixes the upper edge of the delay chamber 142 to the A-pillar 120 at an area from the ace tab 150 to a boundary 180 between the delay chamber 142 and the serial main chamber 140. The support tab 200 is positioned in the vicinity of a site directly above the A1 impact point.

The support tab 200 has the role of preventing the curtain airbag 100 from shifting upward during inflation and deployment, so that inflation and deployment take place at a proper position. Ordinarily, curtain airbags behave so as to move upward on account of reaction when inflating and deploying. By providing the support tab 200 separately from the ace tab 150, as in the present embodiment, the support tab 200 is conferred with a clearly different function from that of the ace tab 150, which has the role of preventing ejection out of the vehicle body, by imparting tension to the curtain airbag 100. The respective function of each of the two tabs 150, 200 can thus be distinctively brought out.

The curtain airbag 10 of the comparative example illustrated in FIG. 5(a) is provided with the support tab 200 alone. Therefore, a same support tab 200 fulfills both an ejection mitigation function and a position adjustment function of the curtain airbag 10, and thus both functions are fulfilled less satisfactorily than in the present embodiment of FIG. 2(a).

In the curtain airbag 100 of the present embodiment illustrated in FIG. 3, the lower end of the inflated and deployed delay chamber 142 is positioned below the door beltline 160 of the vehicle 102. In the present embodiment, the support tab 200 is provided in addition to the ace tab 150, and hence the position of the curtain airbag 100 is adjusted so as not to rise. However, if the delay chamber 142 is long enough, the lower end of the inflated and deployed delay chamber 142 becomes positioned below the door beltline 160, regardless of the presence or absence of the support tab 200. Such a delay chamber 142 elicits the effect of reducing the extent of ejection, by virtue of a reaction force off the door trim 190 by interfering with the latter, also when the delay chamber 142 is pushed out of the vehicle when struck by the head of the occupant. Accordingly, the occupant can be prevented, yet more reliably, from being ejected through the window 114.

Preferred embodiments of the present invention have been explained above with reference to accompanying drawings, but the described embodiments are exemplary, and the invention may be embodied and implemented in other ways, in accordance with various methods. Unless specifically indicated in the description of the present application, the invention is not restricted by the shape, size, configurational arrangement and so forth of the detailed parts depicted in the drawings. The expressions and terms used in the description of the present application are explanatory in purpose, and are not meant to be limiting in any way, unless restricting subject matter to that effect is specifically set forth in the description.

Therefore, a person skilled in the art can devise various alterations or modifications within the scope as set forth in the claims, and it is to be understood that these alterations and modifications belong, as a matter of course, to the technical scope of the present invention.

We claim:

1. A curtain airbag for a vehicle, comprising:
   a serial main chamber that is capable of being inflated and deployed along a vehicle cabin side face;
   a delay chamber that is formed as a non-divided chamber and is positioned at a front end section of the serial main chamber and that is inflated and deployed with delay with respect to the main chamber so as to overlap an A1 impact point below an A-pillar of the vehicle, the A1 impact point being defined by projecting an outline of a impactor head onto the vehicle cabin side face with the outline contacting a perimeter line in upper and lower forward quadrants of a window, the perimeter line being offset 25 mm perpendicularly inward from a frame of the window, the A1 impact point being centered within the outline and being located on an inflated portion of the delay chamber; and
   a first tab that fixes an upper edge of the delay chamber to the A-pillar, wherein
   the first tab is provided at a position overlapping a straight line that is provided on the shortest distance from the A1 impact point to the A-pillar, as viewed from inside the vehicle cabin, the straight line extending over an inflated portion of the delay chamber for the full extent of that portion of the straight line provided over the delay chamber.

2. The curtain airbag according to claim 1, further comprising a second tab that fixes the upper edge of the delay chamber to the A-pillar at an area between the first tab and a boundary between the delay chamber and the serial main chamber.

3. The curtain airbag according to claim 2, wherein a lower end of the delay chamber when inflated and deployed is positioned below a door beltline of the vehicle.

4. The curtain airbag according to claim 1, wherein a lower end of the delay chamber when inflated and deployed is positioned below a door beltline of the vehicle.

5. The curtain airbag according to claim 1, wherein the straight line forms an angle of about 90° with respect to the A-pillar, when the straight line is projected onto the vehicle side face.

6. The curtain airbag according to claim 1, wherein at least one additional tab fixes an upper edge of the curtain airbag to a roof side rail of the vehicle at a shortest distance from an additional impact point defined below the roof side rail in a manner as set out in connection with the first tab.

* * * * *